United States Patent [19]

Foreman, Sr.

[11] 4,330,692
[45] May 18, 1982

[54] TELEPHONE ATTACHMENT FOR SUPPORTING A BOOK OR THE LIKE ABOVE THE TELEPHONE

[76] Inventor: Thomas V. Foreman, Sr., 17706 Carelia La., Spring, Tex. 77379

[21] Appl. No.: 97,142

[22] Filed: Dec. 6, 1979

Related U.S. Application Data

[63] Continuation-in-part of Ser. No. 61,908, Aug. 1, 1979, abandoned.

[51] Int. Cl.³ ............................................. H04M 1/21
[52] U.S. Cl. ..................................... 179/178; 40/336; 248/441 B
[58] Field of Search ............... 179/178, 189 R, 146 R; 40/336; 248/441 B, 441 C

[56] References Cited

U.S. PATENT DOCUMENTS

| | | | |
|---|---|---|---|
| D. 185,453 | 6/1959 | McCracken | D26/14 |
| 3,469,336 | 9/1969 | Halperin | 40/336 |
| 4,159,403 | 6/1979 | Sangster | 179/178 |

Primary Examiner—Thomas W. Brown
Attorney, Agent, or Firm—Jennings B. Thompson; Marvin B. Eickenroht

[57] ABSTRACT

An attachment for a telephone having a finger cavity of the type found in standard desk telephones. The attachment includes an easel member for supporting a book or the like, two spaced base members for supporting the easel member above the telephone, and a hook member for engaging the transverse ridge of the finger cavity of the telephone to attach the attachment to the telephone.

18 Claims, 11 Drawing Figures

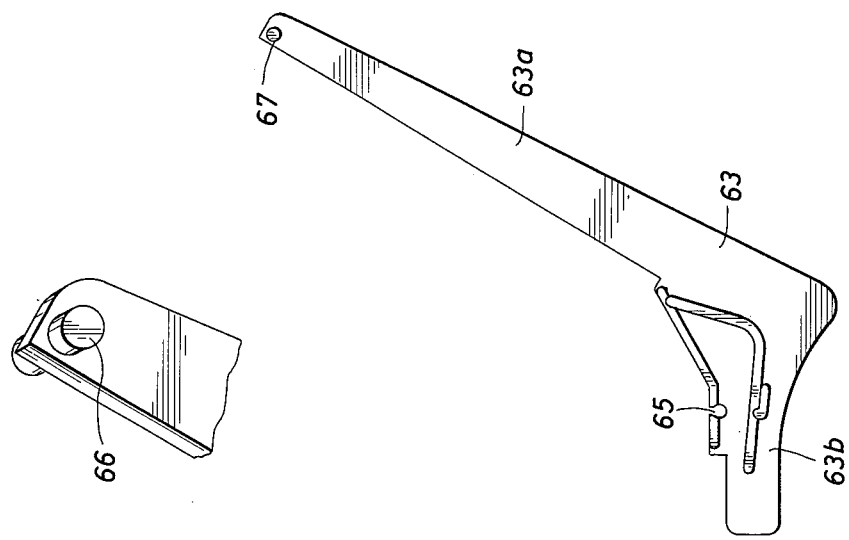
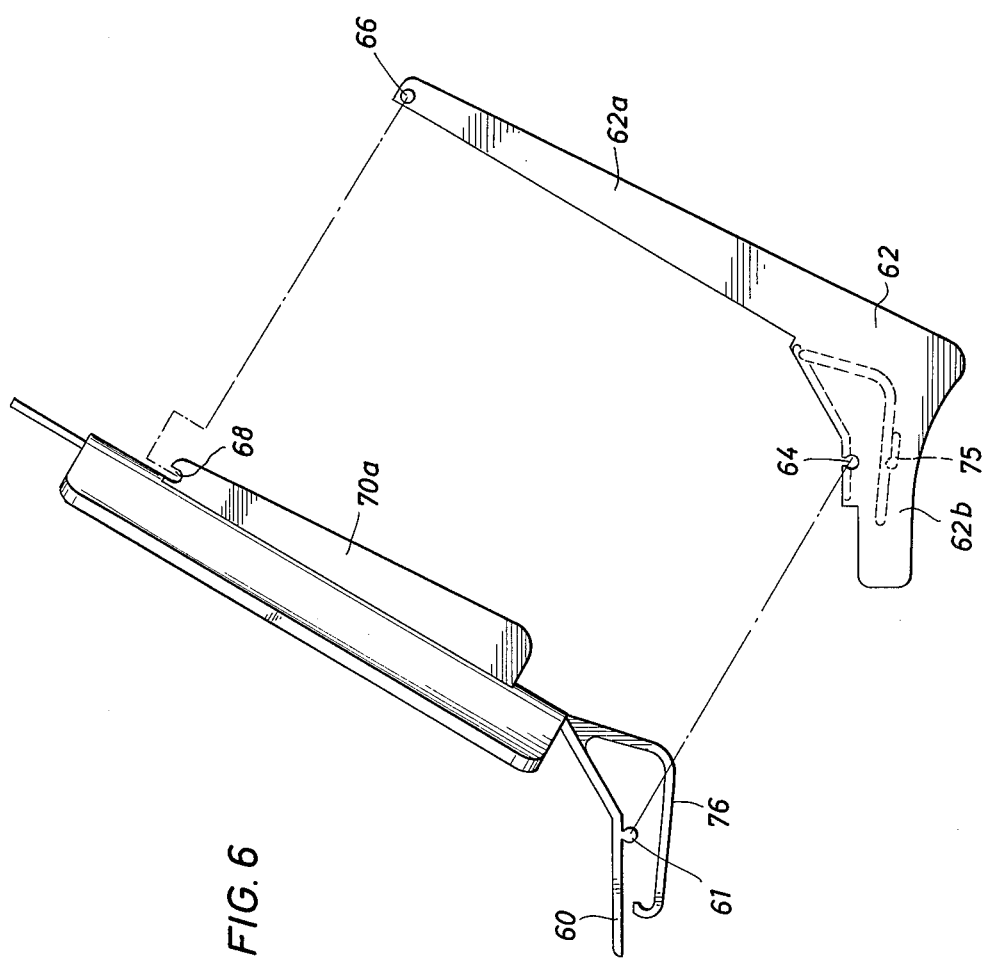

TELEPHONE ATTACHMENT FOR SUPPORTING A BOOK OR THE LIKE ABOVE THE TELEPHONE

This application is a continuation-in-part of application Ser. No. 61,908, filed Aug. 1, 1979, now abandoned.

This invention relates to attachments for telephones generally, and in particular to attachments for telephones having a lifting cavity to receive the fingers of the lifting hand with an anti-slip ridge across the upper wall of the cavity, such as a standard desk telephone.

It is desirable to provide an attachment for a telephone that will support a book or the like so that it can be readily reached or observed by the user of the telephone. It is also desirable to provide such an attachment that can be attached to the telephone without altering or physically damaging the telephone. Also, preferably, such an attachment should be capable of being attached in position to perform its function on the telephone without interfering in any way with the use of the telephone and which relies solely on the configuration of the telephone to provide the means of attaching the attachment to the telephone. Also, preferably such an attachment should be one that can be easily removed from the telephone, when this is desired.

It is an object of this invention to provide an attachment having the above characteristics and advantages.

It is a further object of this invention to provide a telephone attachment that can be quickly and easily adapted for telephones having finger cavities of different sizes.

It is another object of this invention to provide a telephone attachment that cannot be removed from the telephone without a specially shaped tool and one that is not usually found in motel and hotel rooms or carried by the guests in such rooms.

These and other objects, advantages and features of this invention will be apparent to those skilled in the art from a consideration of this specification, including the attached drawings and appended claims.

In the Drawings:

FIG. 6 is an exploded side view of an alternate embodiment of the invention in which the attachment support members can be quickly and easily attached to and removed from the main body of the attachment to facilitate adapting the attachment for telephones of different manufacture or which have different dimensions.

FIG. 7 is a side view of one of the support members of this embodiment of the invention.

FIG. 8 is an isometric view on an enlarged scale of the upper end of the support member of FIG. 6.

Figure 1:
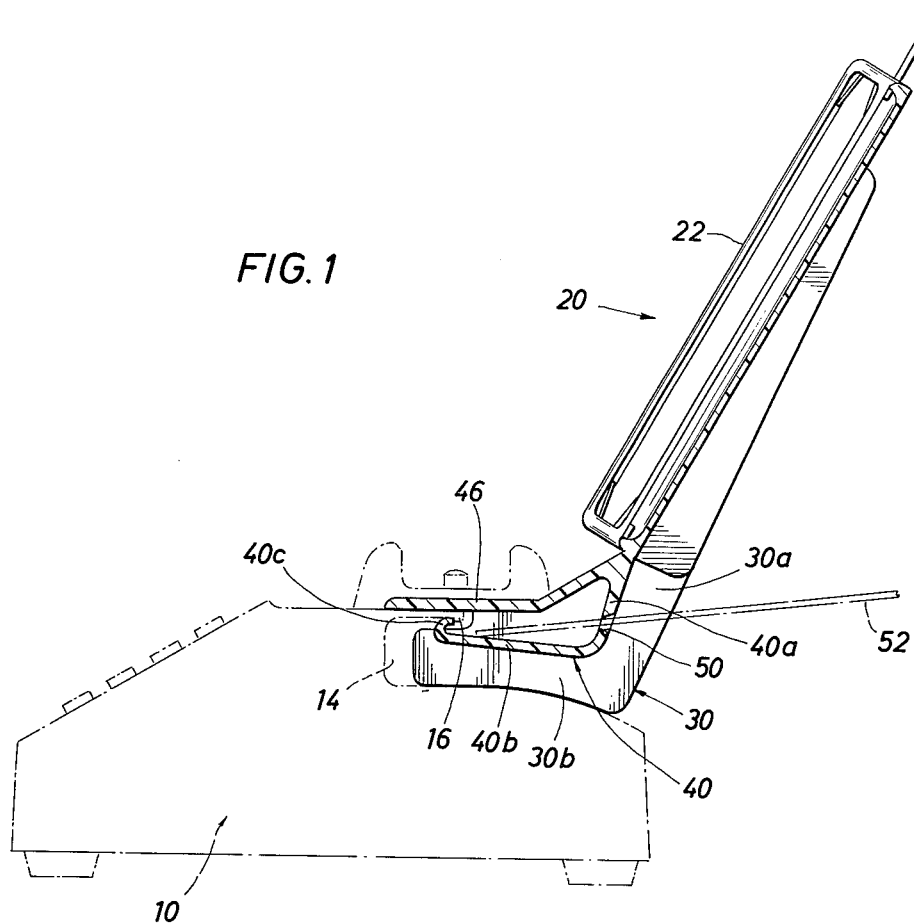
FIG. 1 is a sectional view of the preferred embodiment of the attachment of this invention showing the attachment installed on a standard desk-type telephone, which is shown in phantom lines.

As explained above, the attachment of this invention is designed for use with a telephone having a lifting cavity to receive the fingers of the lifting hand with an anti-slip ridge extending across the upper wall of the cavity. One type of telephone having such a cavity is the standard desk telephone, such as the one shown in phantom lines in FIGS. 1 and 2 and indicated by the number 10. The hand-held portion of the telephone, usually referred to as the receiver, is not shown in these drawings. It is, of course, supported by spaced cradles 11 and 12 in the well-known manner, when it is not in use. Located in the telephone housing below the cradle portion of the telephone is cavity 14, which is provided to facilitate the moving of the telephone from place to place. As is well known, by inserting the fingers of one hand into the cavity with the thumb somewhere along the upper surface of the telephone, the telephone can be easily moved from one place to another. To help secure the hold of the fingers on the telephone, a ridge is located adjacent the upper edge of the cavity and extends transversely of the cavity. The ridge allows a better grip to be maintained on the telephone. This ridge in the drawings is indicated by the number 16.

In accordance with this invention, attachment 20 includes easel-like section or member 22 having two panels 23 and 24 integrally connected at an angle to provide a support for a book or the like. In the embodiment shown, groove 26 is located in between the book supporting panels to accommodate the rings of a spiral or ring-bound book (not shown). Hooks 27 are located at opposite ends of the groove to engage the outside spirals or rings of this type of book to hold the book in position on easel 22. Preferably, of course, the easel section extends upwardly and rearwardly of the telephone to position the book for easy reading and easy access by the user of the telephone. This preferred position relative to the telephone is shown in FIG. 1.

Means are provided for supporting the easel-like member in this desired position above the telephone. In the embodiment shown, the means includes two L-shaped support members 30 and 32 which are in spaced parallel position. These supporting members include upwardly extending leg portions 30a and 32a and base leg portions 30b and 32b.

Figure 3:
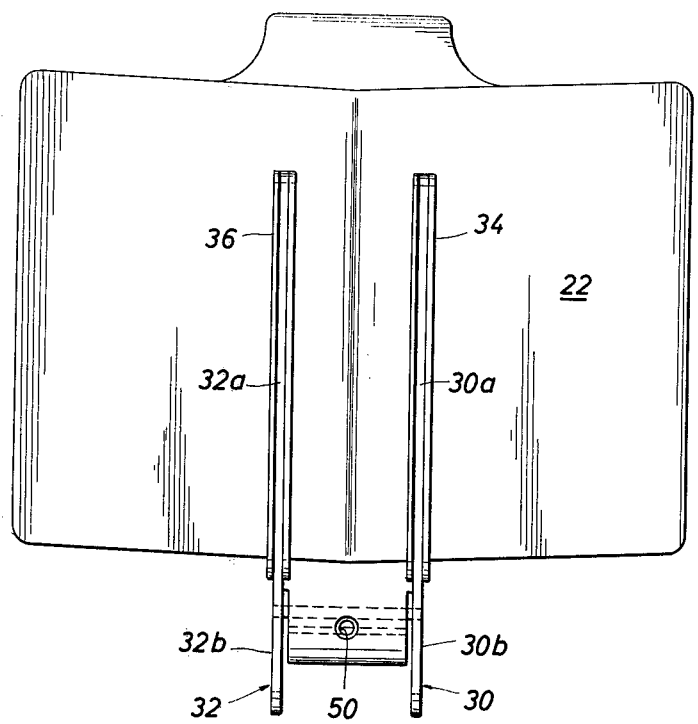
FIG. 3 is a rear view of the attachment of FIG. 1 with the telephone omitted.
Figure 4:
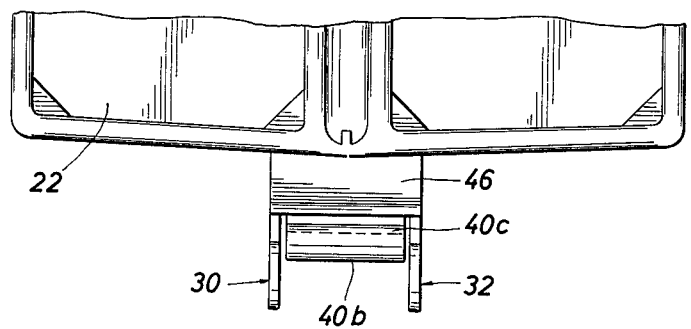
FIG. 4 is a partial front view of the attachment showing only lower portion.
Figure 5:
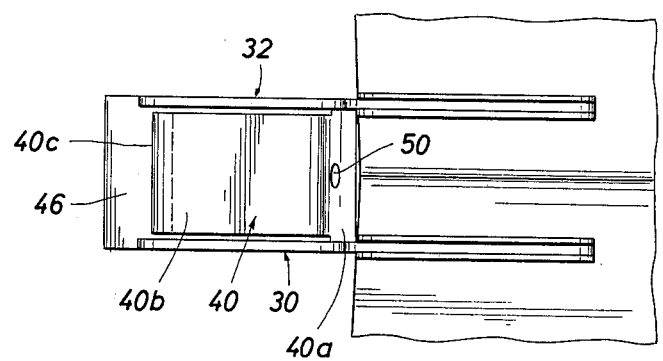
FIG. 5 is a bottom view of the portion shown in FIG. 4.

In the embodiment shown, upwardly extending leg portions 30a and 32a of the support members are connected to the easel section by positioning these portions in elongated grooves provided in parallel mounting flanges 34 and 36 attached to the back of the easel section, as shown in FIG. 3. This arrangement allows the easel section of the attachment and the yet to be described attaching means to be molded in one piece and the supporting means to be molded in another piece and then the two connected together as explained above. The L-shaped supporting members after being positioned in the grooves of the mounting flanges are attached to the flanges with an adhesive or, if made of thermoplastic material, by fusing the two together with heat.

Figure 2:
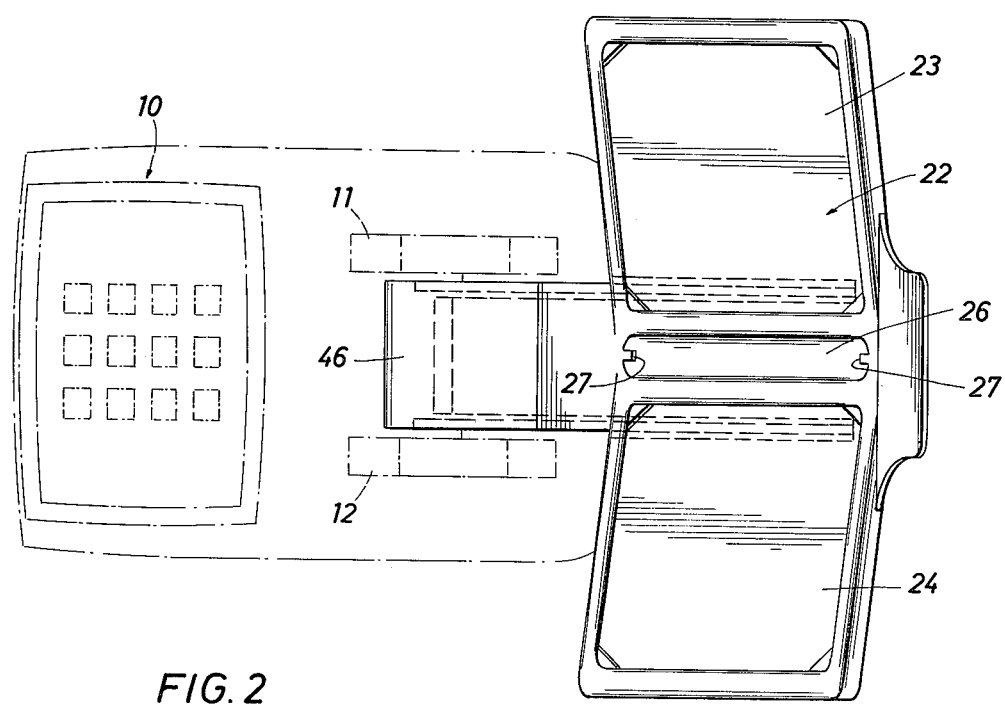
FIG. 2 is a top view of the attachment of FIG. 1.

As best seen in FIG. 1, the lower edges of the two L-shaped support members are contoured to match the contour of the telephone as it slopes downwardly from the lower surface of the finger cavity toward the back of the telephone. As explained above, preferably when the contours mate, the easel section of the attachment is positioned at the proper angle above the telephone. In the embodiment shown, the forward ends of the base portions of the support members extend into the finger cavity and are positioned adjacent the side and rear walls of the cavity.

In accordance with the invention, means are provided for engaging the inner side of the ridge across the upper wall of the lifting cavity of a telephone to hold the supporting means in position in engagement with the telephone to support the easel-like member in the desired position. In the embodiment shown, L-shaped hook member 40 is located between the two spaced parallel base portions of the support members. The L-shaped member has one leg 40a extending upwardly at an angle. The leg is connected to the lower edge of the easel-like member of the attachment. Other leg 40b extends into the finger cavity and is provided with hook 40c to engage the inner surface of transverse ridge 16, as shown in FIG. 1. Preferably, the material from which the attachment is made has sufficient resiliency for the L-shaped member to bend downwardly far enough to allow the hook to pass under the transverse ridge without damage to the member and then, due to its resiliency, snap upwardly into position in engagement with the inner side of the ridge. It also is preferable that the hook member be somewhat bent out of its relaxed position when in engagement with the ridge so that it will continue to exert an upward force urging the hook to maintain its position in engagement with the upper surface of the cavity and the inner edge of the ridge.

It is contemplated that this attachment will be used extensively in hotel and motel rooms. Using the attachment, a multi-page booklet can be positioned above the telephone providing at a convenient location hotel information and also advertisements of the facilities in the hotel and motel and adjacent thereto, such as cafes, beauty parlors, and the like. Consequently, it is desirable that the attachment not be easily removed from the telephone by the guests. In accordance with this invention, removal is at least discouraged by positioning anti-theft plate 46 to cover the L-shaped hook member from above to prevent someone from simply pushing down on the L-shaped member and removing the attachment. As shown in FIG. 1, anti-theft plate 46 has one end attached to the lower edge of the easel section of the attachment and extends across the top of the telephone between receiver cradle portions 11 and 12. Plate 46 should be wide enough to completely cover the L-shaped hook member and also fill the space between the two cradles to prevent someone from reaching the L-shaped hook member from above. Preferably, the anti-theft plate 46 is forced slightly upwardly by the telephone when the attachment is installed on the telephone to insure that the plate is in firm engagement with the surface of the telephone between the two cradles. This allows the plate to serve a secondary function as a dust cap to protect the cavity formed by the L-shaped hook member from being a collecting place for dust and other debris.

Combining with the anti-theft plate to limit easy access to the hook member, are base portions or legs 30b and 32b of the supporting members. As shown in FIG. 1, the base portions extend from the surface of the telephone to the lower surface of the anti-theft plate. The width of the base members is reduced at the forward end so they can extend a substantial distance in the cavity. This also provides lateral stability to the attachment. Thus, the hook member cannot be reached from the top or the side.

To protect the attachment from attack from the rear, the distance from the back of the attachment to the forward end of the hook member is beyond the reach of a finger.

It may be necessary or desirable from time to time to remove the attachment from the telephone. To do so, as explained above, it is only necessary to move the hook portion of L-shaped member 40 downwardly out of engagement with the ridge. In the embodiment shown, hole 50 is located in upwardly extending leg 40a of the L-shaped hook member through which a thin stiff rod, such as rod 52, shown in phantom lines in FIG. 1, can extend into engagement with the outer end of the hook portion of L-shaped member 40. The rod can then be used as a lever with the wall of the hole in the legs as a fulcrum to pry hook 40c downwardly out of engagement with ridge 16 to allow the attachment to be easily removed from the telephone. By making the hole small enough that a special thin but stiff rod is required to remove the attachment, a rod which would not readily be found in a hotel room or carried by a guest, the likelihood of the attachment being stolen is greatly reduced.

In FIGS. 6 through 11, an alternate embodiment of the invention is shown. This embodiment differs from the embodiment in FIGS. 1 to 5 in two ways. First, the arrangement for attaching the L-shaped support members to the easel section is modified so that these members are not permanently attached to the easel section but can be removed and replaced quickly and easily. Also, the attaching arrangement for the support members connects the anti-theft plate to the support members so that it cannot be pried upwardly away from the upper surface of the telephone between the cradle. Secondly, the fulcrum around which the latch member pivots is moved closer to the hook end of the latch member to increase the resilient force exerted by the latch member against the upper surface of the cavity of the telephone. These two structural changes provide more structural rigidity to the easel when attached to the telephone and make it much more difficult for the easel to be removed from the telephone by someone not having the proper tools.

In the modified arrangement for attaching the L-shaped support members, circular rod 61 extends transversely across the lower surface of the anti-theft plate 60 and is attached thereto. L-shaped supporting members 62 and 63 are provided with grooves 64 and 65, respectively, in the upper edges of their lower legs 62b and 63b. These grooves are designed to receive the ends of rod 61 to securely connect legs 62b and 63b of the supporting members to anti-theft plate 60. Upwardly extending legs 62a and 63a of support member 62 and 63 are provided with transversely extending pins 66 and 67 respectively. These pins, as best seen in FIG. 8, extend outwardly from both sides of the upper end of the support members and are positioned to be received in grooves 68 (only one of which is shown) in the upper ends of each pair of parallel mounting flanges 70a and 70b and 71a and 71b.

To attach supporting member 62 to the easel section of the attachment, pin 66 is positioned in groove 68 and the upper leg portion of the support member is located in the groove provided by parallel mounting flanges 70a and 70b. At the same time that the supporting member is rotated into position between the mounting flanges, lower leg 62b is bent outwardly far enough to position groove 64 to receive the outer end of pin 61 as leg 61b moves inwardly to its unstressed position. With the pin located in groove 64 and pin 66 located in groove 68, the support member is firmly attached to the easel section of the attachment.

Figure 9:
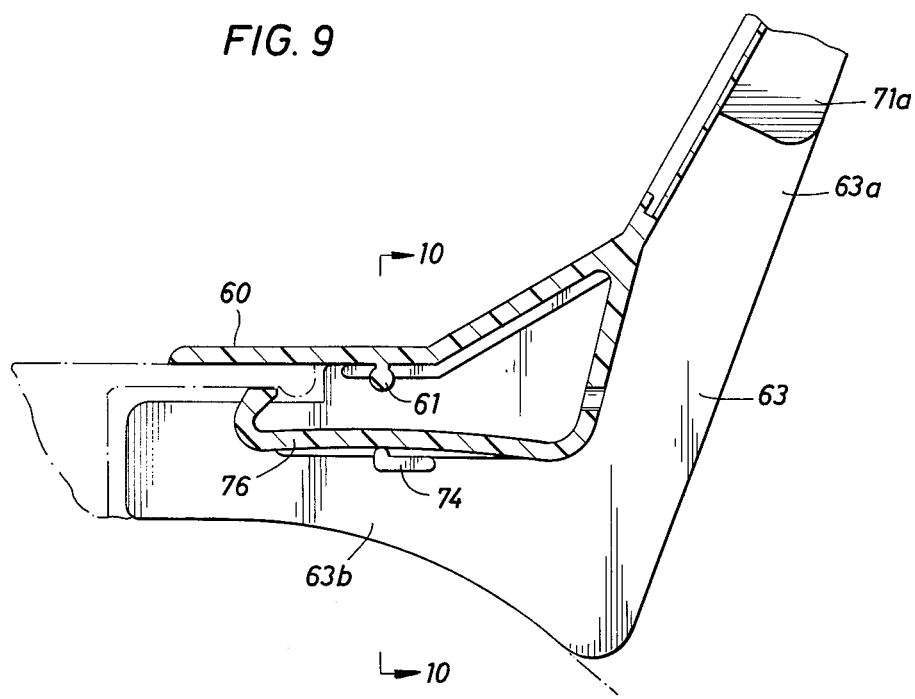
FIG. 9 is a vertical sectional view of the lower portion of the attachment of FIG. 6 with a portion of the telephone to which it is attached shown in phantom lines.
Figure 10:
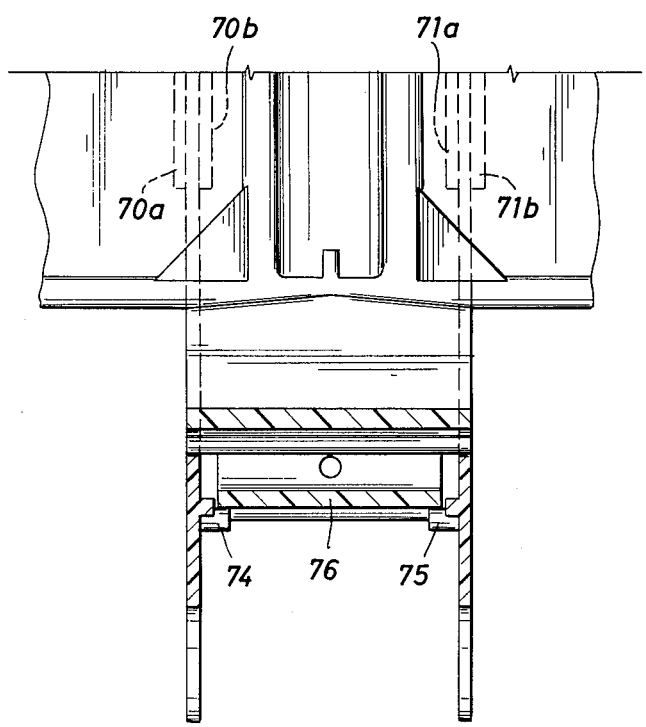
FIG. 10 is a view taken along line 10—10 of FIG. 9.

In the same manner, supporting member 63 is attached to the opposite side of pin 61, as shown in FIG. 9. When so assembled and in position in the lifting cavity of the telephone, as shown in FIG. 9, upward movement of anti-theft plate 60 is resisted by pin 61 which is held against upward movement by the lower portions of the support members located in the cavity. Further, the support members cannot be removed from the easel section, while the attachment is attached to a telephone, because the sides of the finger cavity will prevent the lower legs of the supports from being moved laterally far enough to clear the end of pin 61.

As explained above, one of the important features of this attachment is that the support members used are molded separately from the main body or easel section of the attachment. This is advantageous because the lifting cavity in telephones made by different manufacturers vary somewhat in shape and size. Therefore, it is necessary to provide different supporting members for each make of telephone. In the first embodiment, where the support members were permanently attached to the easel section, after the support members had been assembled the attachment would be useful only with one make of telephone. In this embodiment, should it be desired to move the attachment from one make of telephone to another, the supporting members can be quickly and easily removed and replaced by supporting members that are designed to fit the particular telephone in question. Also, by eliminating the step of fusing or gluing the support members to the easel section, a considerable amount of assembly time is eliminated.

Figure 11:
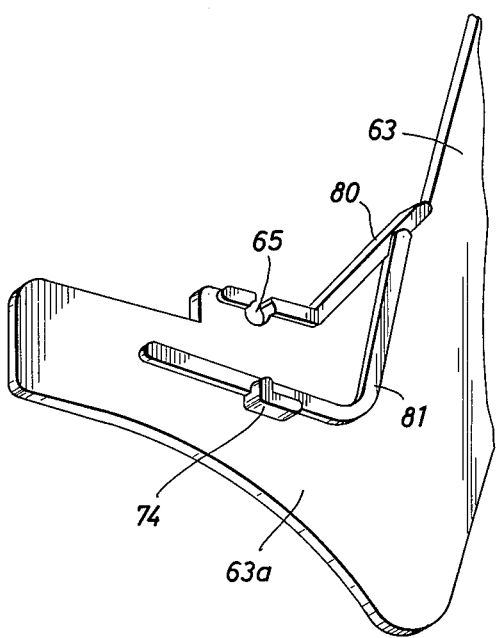
FIG. 11 is an isometric view, on an enlarged scale, of the lower portion of one of the support members of this embodiment.

As explained above, in this embodiment, the fulcrum point around which the latch or hook member pivots is moved closer to the end of the latch member to increase the resilient force the latch member exerts upwardly against the upper surface of the cavity of the telephone. As shown in FIG. 11, L-shaped pivot member 74 is attached to the inside surface of leg portion 63a of support member 63. A similar L-shaped pivot member 75 is positioned on the inside surface of leg portion 62b of leg 62, as shown in FIG. 6. The short leg of these L-shaped pivot members has a rounded upper surface positioned to engage the lower surface of latch member 76, as shown in FIG. 9. This arrangement greatly increases the stiffness of latch member 76, which improves its ability to hold the attachment in position on the telephone.

To improve the ability of the support members to resist the loads imposed on the support members by pin 61 and pivot members 74 and 75, sections 80 and 81 of increased thickness are provided on leg 63. Similar thicker sections are also provided on leg 62 for the same purpose.

From the foregoing it will be seen that this invention is one well adapted to attain all of the ends and objects hereinabove set forth, together with other advantages which are obvious and which are inherent in the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An attachment for a telephone such as a standard desk telephone having a lifting cavity to receive the fingers of the lifting hand with an anti-slip ridge across the upper wall of the cavity, said attachment comprising an easel-like member for supporting a book or the like above the telephone, means connected to the easel-like member for engaging the telephone to support the easel-like member in the desired position, and a hook member having one end connected to the attachment and one end formed as a hook for extending into the cavity to engage the inner side of the anti-slip ridge in the upper wall of the lifting cavity of a telephone to hold the supporting means in position in engagement with the telephone to support the easel-like member in the desired position, further in which the hook member is made of resilient material and is positioned to be bent downwardly by the anti-slip ridge as the hook is moved into the cavity to cause the hook on the end of the member to move upwardly into firm engagement with the inner side of the anti-slip ridge when the hook has passed the anti-slip ridge.

2. The attachment of claim 1 in which the means for engaging the telephone to support the easel-like member in the desired position includes two spaced parallel base members positioned to engage the surface of the telephone adjacent the finger cavity.

3. The attachment of claim 2 in which the base members extend into the finger cavity.

4. The attachment of claim 1 further provided with an anti-theft plate positioned above the hook member to prevent access to the hook member from above the member.

5. The attachment of claim 4 in which the hook member is L-shaped having an upwardly extending leg connected to the attachment and a generally horizontal leg having a hook on its end for extending into the cavity to engage the anti-slip ridge, and in which the upwardly extending leg has an opening through which a rod can be positioned to move the hook downwardly out of engagement with the ridge to allow the attachment to be removed from a telephone.

6. The attachment of claim 1 further provided with an anti-theft plate connected to the attachment and positioned above the hook member to extend across the cradle of the telephone to prevent access to the hook member from above and in which parts of the base portions of the L-shaped support members extend upwardly to the anti-theft plate to prevent access to the hook member from either side.

7. An attachment for a telephone such as a standard desk telephone having a finger cavity in the body thereof and an anti-slip ridge extending across the top edge of the cavity, said attachment comprising an easel section for supporting a book or the like above the telephone, means connected to the easel section for supporting the easel section above the telephone, said supporting means including a pair of spaced, parallel base members attached to the easel section to extend into the finger cavity to engage the lower surface thereof to support the easel section in the desired position above the telephone, and means for releasably attaching the attachment to the telephone including a hook member of resilient material for extending into the cavity of the telephone to engage the anti-slip ridge therein to hold the base members from movement out of the finger cavity.

8. The easel of claim 7 in which the hook member is made of resilient material and is positioned to be deflected downwardly when positioned in the cavity in engagement with the inside edge of the ridge to exert an upward force on the cavity.

9. The attachment of claim 7 further provided with an anti-theft plate connected to the attachment and positioned above the hook member to extend across the cradle of the telephone to prevent access to the hook member.

10. The attachment of claim 9 in which the base members are L-shaped with each member having one leg extending upwardly along the back side of the easel section and another leg extending generally horizontally into the cavity of the telephone and in which means are provided to attach the generally horizontally extending legs to the anti-theft plate.

11. The attachment of claim 10 in which two pairs of parallel spaced mounting flanges are located on the back side of the easel section to provide grooves to receive the upwardly extending legs of the base members and means are provided to attach the base members to the flanges.

12. The attachment of claim 11 in which the means for attaching the base members to the flanges and to the anti-theft plate include upwardly opening grooves in the upper ends of both pairs of mounting flanges, pins located adjacent the upper ends of the upwardly extending legs for positioning in the grooves in the flanges, a pin attached to and extending transversely across the lower side of the anti-theft plate and openings in the horizontally extending legs into which the pin is snapped.

13. An attachment for a telephone such as a standard desk telephone having a finger lift cavity with a ridge across the upper edge, said attachment comprising an easel section for supporting a book or the like, base means for supporting the easel section, said base means including spaced, parallel L-shaped support members having upwardly extending portions attached to the easel section to support the section above the telephone and base portions for extending into the finger cavity of the telephone to engage the lower surface of the cavity, and means for releasably attaching the base means to the telephone including a hook member of resilient material having one end connected to the attachment for extending into the finger cavity to engage the inner edge of the ridge across the upper edge of the cavity to hold the base portions of the L-shaped support members in the finger cavity to support the easel section in the desired position above the telephone.

14. The attachment of claim 13 in which the hook member is L-shaped having an upwardly extending leg portion attached to the attachment with the other leg portion extending into the finger cavity.

15. The attachment of claim 14 further provided with an anti-theft plate having one end connected to the attachment and positioned to extend over the L-shaped hook member and a portion of the upper surface of the telephone below the receiver to prevent access to the hook member from above, said L-shaped hook member having an opening in the upwardly extending leg portion through which a rod can be extended to force the hook member downwardly out of engagement with the ridge to allow the attachment to be removed from the telephone.

16. The attachment of claim 14 further provided with an anti-theft plate connected to the attachment and positioned above the hook member to extend across the cradle of the telephone to prevent access to the hook member from above and in which parts of the base portions of the L-shaped support members extend upwardly to the anti-theft plate to prevent access to the hook member from either side.

17. The attachment of claim 16 in which two pairs of parallel spaced mounting flanges are located on the back side of the easel section to provide grooves to receive the upwardly extending legs of the base members and means are provided to attach the base members to the flanges.

18. The attachment of claim 17 in which the means for attaching the base members to the flanges and to the anti-theft plate include upwardly opening grooves in the upper ends of both pairs of mounting flanges, pins located adjacent the upper ends of the upwardly extending legs for positioning in the grooves in the flanges, a pin attached to and extending transversely across the lower side of the anti-theft plate and openings in the horizontally extending legs into which the pin is snapped.

* * * * *